Nov. 13, 1951            D. E. HARRIS            2,575,272

RAPID CLOSURE VALVE FOR HIGH-FLOW RATES AT LOW-PRESSURE DROP

Filed July 17, 1947            2 SHEETS—SHEET 1

INVENTOR.
DWIGHT E. HARRIS
BY
Kenyon & Kenyon
ATTORNEYS

Nov. 13, 1951 D. E. HARRIS 2,575,272
RAPID CLOSURE VALVE FOR HIGH-FLOW RATES AT LOW-PRESSURE DROP
Filed July 17, 1947 2 SHEETS—SHEET 2

INVENTOR.
DWIGHT E. HARRIS
BY
Kenyon & Kenyon
ATTORNEYS

Patented Nov. 13, 1951

2,575,272

UNITED STATES PATENT OFFICE 2,575,272

RAPID CLOSURE VALVE FOR HIGH-FLOW RATES AT LOW-PRESSURE DROP

Dwight E. Harris, Stamford, Conn., assignor to The Skinner Chuck Company, Norwalk, Conn., a corporation of Connecticut Application July 17, 1947, Serial No. 761,461

6 Claims. (Cl. 137—144)

This invention relates to valves and more especially to solenoid-operated valves.

An object of this invention is a solenoid-operated valve of such design as to provide a high flow rate with low pressure drop, rapid closing and tight sealing.

Other objects, novel features and advantages of this invention will become apparent from the following specification and accompanying drawings, wherein.

Figure 1:
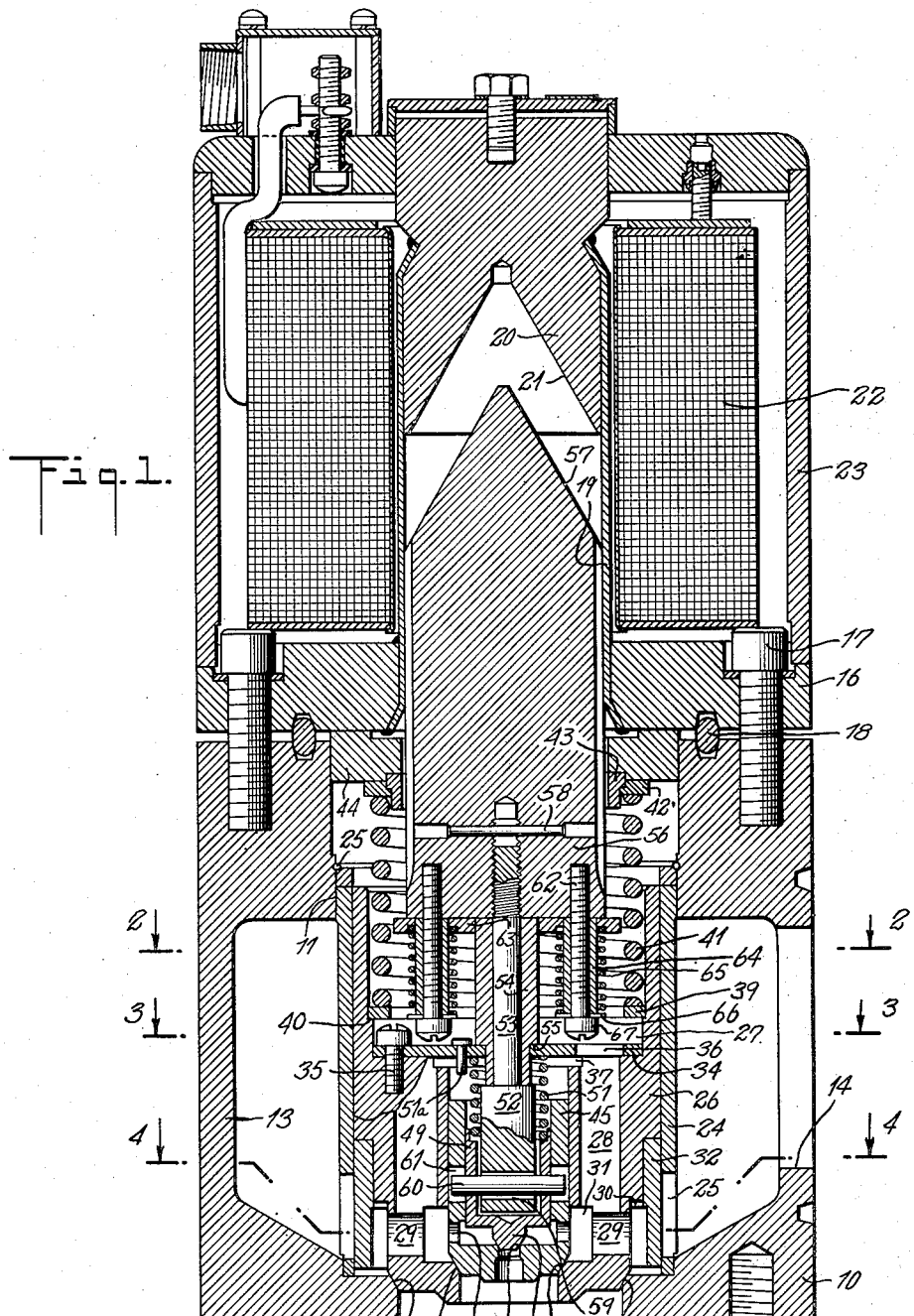
Fig. 1 is an axial section through one embodiment of the invention.
Figure 2:
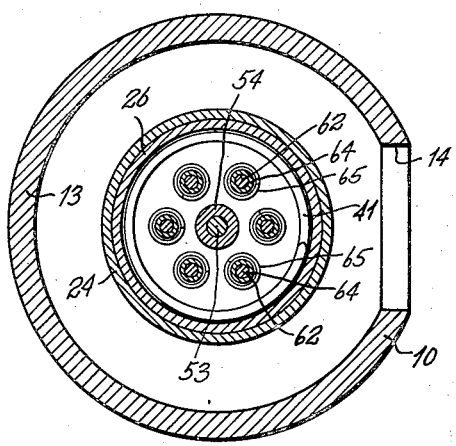
Fig. 2 is a section on the line 2—2 of Fig. 1.
Figure 3:
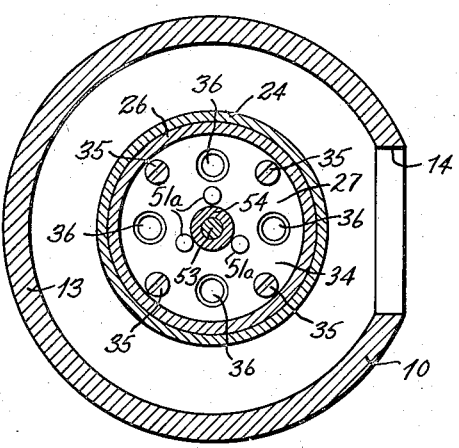
Fig. 3 is a section on the line 3—3 of Fig. 1.
Figure 4:
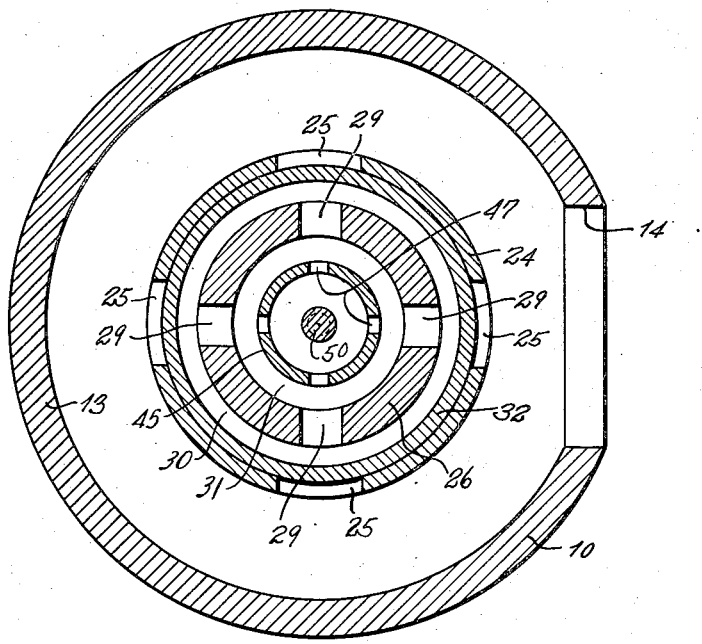
Fig. 4 is a section on the line 4—4 of Fig. 1.

A cylindrical base 10 is provided with a central bore 11 near one end of which is formed a valve seat 12. The bore 11 is formed with an enlarged portion 13 and a port 14 communicates with said portion. That portion of the bore 11 below the valve seat constitutes a second port 15 communicating with the enlarged portion 13. An annular cover 16 is attached to the upper end of the body 10 by bolts 17 with a sealing gasket 18 interposed between the cover and the body. A sleeve 19 of non-magnetic metal extends through and is supported by the cover 16 and is closed at its upper end by a plug 20 of magnetic metal in the lower face of which is formed a conical recess 21. An electromagnetic coil 22 surrounds the sleeve 19 and is enclosed by a cup-shaped cap 23 which is attached to the plug 20, the cap being composed of several coacting parts. Suitable connections are provided for supplying electric current to the coil 22.

A cylinder 24 located in the bore 11 is held in place by a snap ring 25 and washer and near its bottom edge, the cylinder 24 is provided with a series of spaced apertures 25. Within the cylinder 24 is slidably mounted a sleeve 26 in the upper end of which is formed a recess 27 from the bottom of which extend a plurality of passageways 28 terminating short of the bottom of the sleeve. Each passageway 28 communicates with a radially arranged passageway 29, one end of which communicates with a circular groove 30 in the outer periphery of the sleeve 26 and the other of which communicates with a circular groove 31 in the inner periphery of the sleeve 26. An annular band 32 surrounds the lower end of the sleeve 26 in overlying relation to the groove 30 and in the lowermost position of the sleeve the band 32 closes the apertures 25. At its lower end, the bore of the sleeve 26 is formed with a valve seat 33 and an annular plate 34 rests on the bottom of the recess 27, the plate 34 being attached to the sleeve by bolts 35 and having apertures 36 communicating with the passageways 28. The sleeve 26 is formed with a groove 37 in its inner periphery providing communication between the sleeve bore and the passageways 28. The lower end of the sleeve is of conical form to provide a valve head 38 for cooperation with the valve seat 12.

A ring 39 rests on a shoulder 40 formed in the recess 27 of the sleeve 26 and engages the bottom end of a helical spring 41, the top end of which engages a ring 42 which surrounds a collar 43 with both the ring 42 and collar 43 contacting the under face of an annulus 44 arranged in the upper end of the bore 11 and contacting the cover 16. The spring 41 opposes upward movement of the ring 39 and sleeve 26.

A second sleeve 45 is slidably mounted in the bore of the sleeve 26 and in the lower end of the sleeve bore there is provided a valve seat 46. The sleeve 45 is provided with radial passageways 47, the outer end of which communicates with the groove 31 of the sleeve 26. At its bottom end, the second sleeve 45 is of conical shape to form a valve plug 48 for cooperation with the valve seat 33.

A cup 49 is slidably mounted in the bore of the second sleeve 45 and is provided with a conically shaped head constituting a valve plug 50 for cooperation with the valve seat 46. A helical spring 51 interposed between the plate 34 and the cup 49 biases the cup downwardly. Three pins 51a press fitted into the plate 34 serve to centrally locate the spring 51.

Within the cup is slidably arranged a piston 52 from which a smaller diameter stem 53 extends upwardly through a sleeve 54 having a portion of reduced diameter extending through the bore of the annulus 34, the sleeve being supported from the annulus by the shoulder 55. The upper end of the sleeve 54 engages a magnetic metal core 56 slidably mounted in the sleeve 19 and having a cone-shaped upper end 57 of proper shape to be received in the recess 21. The stem 53 is threaded into the lower end of the core 56 and is held against rotation by a pin 58.

In the piston 52 is provided a diametrical bore 59 in which is mounted a pin 60, the ends of which project through apertures in the wall of the cup 49 into holes 61 in the sleeve 45. The bore 59 is somewhat larger than the diameter of the pin 60 so that the piston 52 may move slightly relative to the pin and the holes 61 are of greater length than the pin diameter, thus providing a lost motion connection between the piston 52 and the sleeve 45.

A plurality of bolts 62 are mounted in the bottom end of the core 56 and pass through apertures in a disk 63 engaging the bottom face of the core 56. Each bolt is enclosed by a sleeve 64 extending through one of the disk apertures and being surrounded by a coil spring 65. At the bottom end of each sleeve 64 is provided a ring 66 engaged by one end of the spring 65 and held in place by the head 67 of the bolt 62.

When the above-described device is in use, a fluid supply pipe is connected to the port 14 and a fluid discharge pipe is connected to the port 15. With the coil 22 de-energized, the valve heads 38, 48 and 50 engage respectively the valve seats 12, 33 and 46 while the apertures 25 are closed by the ring 32. The various cavities or recesses in the block, the sleeves and the cup are filled with fluid under the pressure existing at the inlet port 14, and the various valve heads are urged against their seats under such pressure. Upon energization of the coil, the core 56 is urged upwardly, thereby exerting a pull on the piston 52 which is communicated through the pin 60 to the cup 49, to disengage the valve head 50 from the valve seat 46 thereby permitting flow of fluid to the port 15 by way of the passageways 47 with consequent decrease in the fluid pressure exerted against the seats of the two sleeves 26 and 45 due to the holes 25 being substantially sealed by the ring 32. Continued upward movement of the core 56 brings the pin 60 into engagement with the top surfaces of the holes 61 to lift the sleeve 45, thereby permitting additional flow to the port 15 through the passageways 28 and 29, grooves 31 and the outlet end of the bore of the sleeve 26, thereby causing reduction of the fluid pressure within the cylinder 24 almost to the outlet pressure due to the holes 25 being substantially sealed by the ring 32. Such upward movement of the cup compresses the spring 51 until the shoulder of the piston 52 engages the annulus 34. Still further upward movement of the core 56 lifts the sleeve 26 to open the apertures 25 and disengage the valve head 38 from the valve seat 12 thereby permitting free flow through the chamber 13 from the port 14 to the port 15. Upward movement of the core 56 continues under the influence of the magnetic field until the upper end of the core 56 engages the recess 21 with concurrent compression of the spring 41. The continued upward movement of the core 56 also engages the ring 63 with the collar 43 thereby compressing the springs 65.

Upon de-energization of the coil 22, the springs 65 act to separate the core 56 from the plug 20 after which the springs 41 and 51 cooperate to return the various valve plugs to their original positions. Rapid closing of the valve is accomplished by means of the passageways 28 in the sleeve 26 which permit rapid transfer of fluid through the sleeve into the cavity above it during closing of the valve. Due to the fact that the band 32 seals off the flow from the inlet port 14 until the valve head 38 has been disengaged from the seat 12, pressure in port 14 is not applied to the area around valve seat 33 of sleeve 26 during the opening cycle. Therefore, there is no pressure which would tend to prevent sleeve 26 from being lifted during the opening cycle.

The valve above described has been designed for use to control fluid flow through 4" pipes. Such a valve will handle flows up to 18 gallons per second with 20 p. s. i. pressure drop, a maximum operating pressure of 650 p. s. i. and approximately $\frac{1}{10}$ second closing time. Thus it is evident that the valve will handle high flows at low pressure drops and has a very fast closing. While the invention has been disclosed in a single embodiment, it is to be understood that the features of the invention are adaptable to various forms of apparatus and that changes may be made in the structure herein described without in any way departing from the spirit of the invention as defined in the appended claims.

I claim:

1. A valve comprising a base having a bore defining an inlet, an outlet and a first valve seat between said inlet and outlet; a cylinder in said bore having one or more apertures communicating with said inlet and valve seat, said cylinder separating said inlet and valve seat except for said apertures; a first cylindrical sleeve slidably mounted in said cylinder and effective in the closed position of said valve to cover said apertures, said first sleeve having a first valve head on the exterior of one end face thereof for cooperation with said first valve seat, intercommunicating longitudinal and radial passageways in said first sleeve, a circular recess in said first sleeve surrounding said first valve head and communicating with the outer ends of said radial passageways and with the exterior of said end face, a second circular recess in the inner cylindrical surface of said first sleeve communicating with the inner ends of said radial passageways and with the interior of said first sleeve, a second valve seat on the interior of said end face; a second cylindrical sleeve slidably mounted in said first sleeve and having on the exterior of one end face thereof a second valve head for cooperation with said second valve seat, radial passageways in said second sleeve communicating with said second circular recess of said first sleeve in the closed position of said valve and with the interior of said second sleeve, a third valve seat on the interior of said end face of said second sleeve; a cup slidably mounted in said second sleeve and having a third valve head for cooperation with said third valve seat; a piston connected to said cup; means for opening said valve comprising means for moving said piston serially to separate the respective said valve heads and seats in an order inverse to the order of their mentioning upon predetermined valve opening movements of said piston including a lost motion connection between said piston and said second sleeve and a second lost motion connection between said piston and first sleeve; and means for closing said valve comprising means biasing said cup toward the end face of said second sleeve, said second sleeve toward the end face of said first sleeve, and the end face of said first sleeve toward said first valve seat.

2. A valve as in claim 1 in which said means for moving said piston comprises electro-magnetic means including a movable core connected to said piston and a coil for moving said core, said valve including a member and resilient means connected to said core biasing said member toward said core, and a stop on said base engageable by said member upon a predetermined valve opening movement of said core by said coil whereby further movement of said core separates said member from said core against the biasing force of said resilient means and said core is biased by said resilient means away from said coil after further movement of said core more than said predetermined movement.

3. A valve as in claim 2 in which said stop comprises a cover for said bore near the end of said first sleeve away from said valve heads, said movable core being movable through said cover and having studs projecting from the end of said core into said bore, said member comprising a plate slidably supported by said studs and said resilient means comprising springs on said studs biasing said plate toward said core.

4. A valve comprising a base having a bore defining an inlet, an outlet and a first valve seat between said inlet and outlet; a cylinder in said bore having one or more apertures communicating with said inlet and valve seat, said cylinder separating said inlet and valve seat except for said apertures; a first cylindrical sleeve slidably mounted in said cylinder and effective in the closed position of said valve to cover said apertures, said first sleeve having a first valve head on the exterior of one end face thereof for cooperation with said first valve seat, intercommunicating longitudinal and radial passageways in said first sleeve, a circular recess in said first sleeve surrounding said first valve head and communicating with the outer ends of said radial passageways and with the exterior of said end face, a second circular recess in the inner cylindrical surface of said first sleeve communicating with the inner ends of said radial passageways and with the interior of said first sleeve, a second valve seat on the interior of said end face; a second cylindrical sleeve slidably mounted in said first sleeve and having on the exterior of one end face thereof a second valve head for cooperation with said second valve seat; a piston for moving said second sleeve; means for opening said valve comprising means for moving said piston serially to separate the respective said valve heads and seats in an order inverse to the order of their mentioning upon predetermined valve opening movements of said piston including a lost motion connection between said piston and first sleeve; and means for closing said valve comprising means biasing said second sleeve toward the end face of said first sleeve, and the end face of said first sleeve toward said first valve seat.

5. A valve as in claim 4 in which said means for moving said piston comprises electro-magnetic means including a movable core connected to said piston and a coil for moving said core, said valve including a member and resilient means connected to said core biasing said member toward said core, and a stop on said base engageable by said member upon a predetermined valve opening movement of said core by said coil whereby further movement of said core separates said member from said core against the biasing force of said resilient means and said core is biased by said resilient means away from said coil after further movement of said core more than said predetermined movement.

6. A valve as in claim 5 in which said stop comprises a cover for said bore near the end of said first sleeve away from said valve heads, said movable core being movable through said cover and having studs projecting from the end of said core into said bore, said member comprising a plate slidably supported by said studs and said resilient means comprising springs on said studs biasing said plate toward said core.

DWIGHT E. HARRIS.

REFERENCES CITED

The following references are of record in the file of this patent:

UNITED STATES PATENTS

| Number | Name | Date |
|---|---|---|
| 594,633 | Lunken | Nov. 30, 1897 |
| 628,671 | Newman | July 11, 1899 |
| 822,023 | Schreidt | May 29, 1906 |
| 1,062,213 | Delaunay et al. | May 20, 1913 |
| 1,176,417 | Wood | Mar. 21, 1916 |
| 1,540,954 | Rockwell | June 9, 1925 |
| 1,877,542 | Wagner | Sept. 13, 1932 |
| 2,392,741 | Hurlburt | Jan. 8, 1946 |
| 2,492,628 | Goepfrich | Dec. 27, 1949 |

FOREIGN PATENTS

| Number | Country | Date |
|---|---|---|
| 699 | Australia | of 1926 |
| 137,227 | Germany | Dec. 13, 1902 |